United States Patent [19]

Pottier et al.

[11] Patent Number: 4,459,664

[45] Date of Patent: Jul. 10, 1984

[54] MULTIPROCESSOR COMPUTER SYSTEM WITH DYNAMIC ALLOCATION OF MULTIPROCESSING TASKS AND PROCESSOR FOR USE IN SUCH MULTIPROCESSOR COMPUTER SYSTEM

[75] Inventors: Denis R. C. Pottier, L'Hay les Roses; Edmond Lemaire, Maurepas; Luyen Letat, Paris; Jean Gobert, Bois d'Arcy, all of France

[73] Assignee: U.S. Philips Corporation, New York, N.Y.

[21] Appl. No.: 351,397

[22] Filed: Feb. 23, 1982

[30] Foreign Application Priority Data

Feb. 25, 1981 [FR] France ............................. 81 03747

[51] Int. Cl.³ .......................... G06F 13/00; G06F 9/19
[52] U.S. Cl. .................................................. 364/200
[58] Field of Search ............................. 364/200, 900

[56] References Cited

U.S. PATENT DOCUMENTS

| 3,825,902 | 7/1974 | Brown et al. | 364/200 |
| 3,997,875 | 12/1976 | Broeren | 364/200 |
| 4,001,783 | 1/1977 | Monahan et al. | 364/200 |
| 4,047,161 | 9/1977 | Davis | 364/200 |
| 4,189,771 | 2/1980 | Roever | 364/200 |
| 4,412,285 | 10/1983 | Neches et al. | 364/200 |
| 4,414,624 | 11/1983 | Summer, Jr. et al. | 364/200 |
| 4,418,385 | 11/1983 | Bourrez | 364/200 |
| 4,425,618 | 1/1984 | Bishop et al. | 364/200 |

*Primary Examiner*—Jerry Smith
*Assistant Examiner*—William G. Niessen
*Attorney, Agent, or Firm*—Jack E. Haken; James J. Cannon, Jr.

[57] ABSTRACT

A multiprogramming data processing system comprises a plurality of data processing devices P1, P2, P3, P4 each having local storage 110–116 and has furthermore an interconnecting standard bus 100. The program is divided in program segments S1–S4, while the program segments are grouped into program portions (k, m, n). The respective program portions are each stored at one of the local memory sections. When an extended branch instruction calls an address in a different program portion, a portion change interrupt signal (26) is generated, whereby dynamical allocation of the execution of program segments may be realized. When a privileged portion (0) is called, the portion change interrupt is nullified, both at the calling to, (28) and the return (23) from the privileged program portion.

4 Claims, 5 Drawing Figures

4,459,664

MULTIPROCESSOR COMPUTER SYSTEM WITH DYNAMIC ALLOCATION OF MULTIPROCESSING TASKS AND PROCESSOR FOR USE IN SUCH MULTIPROCESSOR COMPUTER SYSTEM

BACKGROUND OF THE INVENTION

The invention relates to a multiprogramming data processing system comprising a plurality of data processing devices interconnected by a common standard bus for transporting address signals and data signals, wherein each data processing device comprises:

(a) a local data processor having a first data port connected to the standard bus;
(b) a local memory section having a second data port connected to the standard bus;
(c) a local bus interconnecting the local data processor to the local memory section;
(d) priority means for providing a local data processor with a privileged access to the associated local memory in preference over a memory access arriving over the standard bus;

the data processing system furthermore having an overall memory encompassing the aggregated local memories for storing respective program segments for any program to be executed. Such data processing systems or computer systems are products of the data processing industry.

The notion of a program segment is well-known; the division of a program into segments is executed by the programmer writing the program. The elements of a program segment are usually logically related, for example, in that all such elements are either user data items, or are all parameter values, or are all program code or instruction statements. Segments may be of equal or unequal lengths, while also a single category of elements, such as user data, may be distributed over different segments. The overall memory may encompass a relatively large shared memory of equal or lower operating speed in comparison to the respective local memories. The data processing system may comprise other devices such as input/output devices. The local data processors and/or local memory sections may have different capabilities. A distributed system of the kind described is suitable for parallel execution of a plurality of programs at a time. The stationary linkage of a specific program to one associated data processing device has several disadvantages. In the first place certain program segments may be used in several programs. For example, a certain set of code statements may be used with different sets of user data, while each set of user data must furthermore be processed by means of respective further sets of code statements. Now the memory capacity would be stressed if the common segment(s) were stored a plurality of times, each time at a respective one of the data processing devices. Furthermore, in case of a modification within a common segment, the uniqueness of the content would be destroyed. Alternatively, if a common segment were stored only once, frequent access thereto via the standard bus would be detrimental to processing speed. Furthermore the capacity of one local memory would readily be insufficient to store all segments of one long program. Finally such stationary linkage would be quite unflexible.

SUMMARY OF THE INVENTION

It is an object of the present invention to provide a multiprogramming data processing device as explained herebefore with means for allowing dynamic assignment of respective prorams to respective data processing devices therein without the need for centralized interrogation of all data processing devices as concerning the status of execution of the program assigned thereto and to realize the required mechanisms with quite modest additions to the respective data processing devices.

The object of the invention is realized in that the data processing system furthermore has waiting list means for receiving and storing a succession of program execution request signals arriving by way of the standard bus and for each such request signal generating a waiting list item for an associated data processing device;

and wherein each data processing device furthermore comprises:

e. first detector means for selectively detecting during execution of a program segment therein a non-branch instruction, a first type branch instruction governing a branch within the current program segment, and a second type branch instruction governing a branch outside the current segment;

f. second detector means for upon detection of a second type branch instruction selectively detecting a branch within the current program portion containing the program segment being executed and a portion changing branch to a second program portion differing from the current program portion and thereupon generating a portion changing interrupt signal while terminating the execution of the current program portion;

g. execution request signalling means for upon generation of a portion changing interrupt signal accessing said waiting list means with a program execution request signal for the program containing the program portion thus terminated and a waiting list accessing signal for interrogating a waiting list item from its own waiting list.

Consequently, two new elements are introduced. In the first place, the portion of a program is built up from one or more segments of that program. The portion, by virtue of allocating a portion number to its constituent program segments, may be realized by the programmer during generation of the program. Alternatively, the portion number is allocated dynamically during loading of the program: the portion number should preferably be the same as the portion number of one or more program segments resident in the same local memory and also forming part of the same program. It is however, sometimes preferable that one or more program portions contain only a single program segment. The first portion number allocating method would ensure that program segments having a strong operational interrelationship, for example, in that one would frequently address the other(s), would reside in the same local memory. In any case, segments contained in the same program portion must also be contained in the same local memory section. If a segment of a specific program portion is being loaded, it is mandatory that further segments of the same program portion should be accommodated in the same local memory section.

Now, it is not necessary to include the portion number in the writing of the source program and the notion thereof does not complicate the task of the programmer.

Furthermore, the portability of the program from one machine to another is maintained; for example, in the case where a single processing device were present, the control system of this elementary system could ignore the portion number by disabling the second detector means.

The waiting list means may reside in a specific program that is residential in a specific one of the data processing devices; for each of the data processing devices a waiting list is being kept of the program execution request signals. The distribution of execution time may be based on a momentary priority: each program remains under execution until a portion change interrupt occurs and then the next level of priority is taken up. Otherwise, the maximum uninterrupted execution time for any program portion could be limited to a predetermined maximum value. Also, other types of time distribution may be used. In the above situation the specific data processing device that contains the waiting list means functions as a central processing device.

Alternatively, each data processing device could form a list of received program execution request signals directed to itself. The next program to be executed would then again be selectable from the respective data processing devices own waiting list. In consequence, the execution of a program is dynamically assigned to the data processing device containing the program portion being executed within that program. If the destination portion is present at the same data processing device as the origin portion, in certain situations it may be necessary to reorganize the local memory section, for example if a portion of a program is no longer needed it could be unloaded to background memory. If the destination portion is present at a different data processing device, the waiting list of the latter gets a new item. Also in this case the origin portion may be unloaded to background memory. In special cases, as will be explained hereinafter, a local data processor may execute a program portion, present in another local memory.

In a preferred mode of execution each data processing device furthermore comprises third detector means for detecting in a second type branch instruction a predetermined program portion number and thereupon nullifying the associated portion changing interrupt signal both at entering and at returning from said predetermined program portion.

An advantageous realization of this concept is attained when the control system of the data processing device would have capacity for storing a portion number (A). Upon occurrence of a portion change trap, two further portion numbers would be relevant, the program portion being executed (B) and the number of the destination program number (C). Normally, A and B are equal, while A is updated at each program portion change. Now however, the predetermined portion number may be associated to a program portion containing an often used service routine. In certain circumstances it is advantageous that a change to such service routine would not entail terminating the execution of the current program portion, and the change-over between the data-processing devices, because this would slow-down the overall capability of the data processing system. In this respect it should be noted that each portion change takes a certain time because register contents must be saved and other termination steps taken. Thus the slow-down by resorting to a non-privileged access to a local memory section would be less than the slow-down by effecting a portion change.

If in such case portion number A is not updated, at the return to the originating portion, the portion numbers A and C would be equal. The latter condition is readily detectable. In certain other cases no switch to a different data processing device is undertaken even if the latter contains the destination program portion. This would be the case with dynamically shared programs. Such double access to shared programs has, for example, been disclosed in U.S. Pat. No. 3,997,875 assigned to the assignee of this application. The shared program could, for example, be the control program of a printer device. The situation could also be the other way round, where the data processing device currently performing the execution calls the control program of the printer, which control program is then executed by a different data processing device. The latter could execute the control program (portion) as a prerequisite to outputting its own updated information (e.g. user data program portion). For brevity, this is not explained further.

The difference between the portion change trap mechanism and an older trap mechanism "segment not stored in memory" should be clear. The latter mechanism is used in a hierarchic memory organization with a fast foreground memory and a slower background memory. Addressing of a segment that is not present in the foreground memory necessitates the loading of the latter segment according to a segment replacement algorithm. Typically this feature is part of a monoprocessor system. According to the above, the portion change trap occurs when the destination segment is already present in memory. Of course, the present invention could be combined with this older mechanism, where the calling of a program portion not resident in any local memory section would trigger a different trap.

The invention also relates to a data processing device for use in a data processing system as described herebefore, wherein said second detector means comprise comparing means for upon decoding of a second type branch instruction comparing the portion numbers of the current program portion and the program portion containing the destination address of the second type branch. In this way a simple realization is reached.

BRIEF DESCRIPTION OF THE FIGURES

An embodiment of a realization according to the invention is described with reference to the following figures.

GENERAL DESCRIPTION OF A PREFERRED EMBODIMENT OF THE MULTIPROCESSOR SYSTEM

Figure 1:
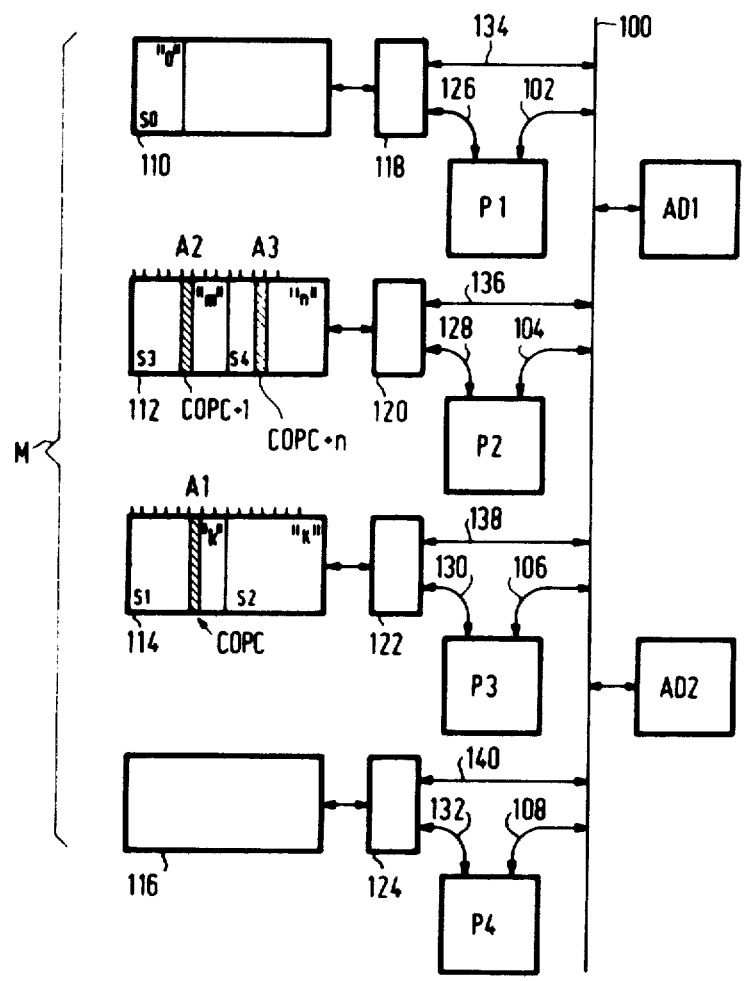
FIG. 1 shows the general lay-out of a multiprocessor data processing system.

FIG. 1 shows the general lay-out of a multiprocessor system. The system, in this embodiment comprises four processors P1, P2, P3, P4, each of which has access to the standard bus 100, via its proper access line 102, 104, 106, 108, respectively. For convenience both these proper access lines and the standard bus 100 have been drawn as only a single line. For brevity, the mechanism for granting the use of the bus to the several data processing devices is no further described; it could be effected by distributed arbitrage. The memory M is divided into four memory sections 110, 112, 114, 116, each provided with its proper memory access device 118, 120, 122, 124. The memory access devices comprise the usual address buffers, data buffers, and furthermore two access ports. One access port is connected to the associated processor (126, 128, 130, 132), while the other one (134, 136, 138, 140) is connected to the standard bus 100. Each memory access device comprises furthermore a priority element for granting a memory access emanating from the associated processor (for example from processor P3 to memory section 114). Priority over a memory access emanating from another processing and communicated therefrom via the standard bus. The priority may be simply realized as follows: the associated request signals are OR-ed to the memory section proper, while the ensued acknowledge signals from the memory section are forwarded to the originator of the request, If both local processor and a non-local processor would request at the same time, the request signal of the former would block the acknowledge signal to the latter. Consequently, data transport via the standard bus is relatively slow for several reasons. In the first place the standard bus is a shared facility among a plurality of potential requesting stations (in this case four). In the second place, even if a request for the standard bus has been granted, the memory access to be effected thereby may be negated because the memory section affected grants priority to an access request by its proper processor. Finally, the local buses 126, 128, 130, 132 may accommodate a higher data rate in that the local memory section and its processor are physically close to each other; also the bust exchange protocol operates slower.

Now, each processor may execute instructions of any program present in the whole of memory M. For enhanced processing capability, generally, the execution of a program segment present in a certain local memory, such as memory 110 is thus assigned to the associated data processor, in this case processor P1. The assignment algorithm is uniquely part of the monitor program or the operating system of the data processing system. Such operating system could be of a conventional nature. The specific data processing device containing the assignment algorithm has a privileged role as a central processor, for example, in that it has the highest priority level in case of multiple simultaneous requests to the standard data bus. The assignment program forms, for every data processing device, a waiting list of programs assigned thereto and ready for execution. Such waiting list could be realized in a respective sequence of storage positions for each data processing device provided with a read pointer and write pointer. Each item of the waiting list comprises the necessary indications for the processor to start execution of the program, such as a program identifier, the address of the starting instruction, and the initial contents of a given number of registers. Generally, the program instructions contained, for example, in memory 114 are more efficiently executed by processor P3 than by others, while data transport is effected via local bus 130. For other memory sections 110 . . . 116 a corresponding situations exists, because then no large-scale data transport over the standard bus 100 would be required.

It should be noted that the standard bus 100 could be connected to other devices AD1, AD2 such as: background memory, input-output devices and datacommunication controllers with associated external communication lines.

Figure 2:
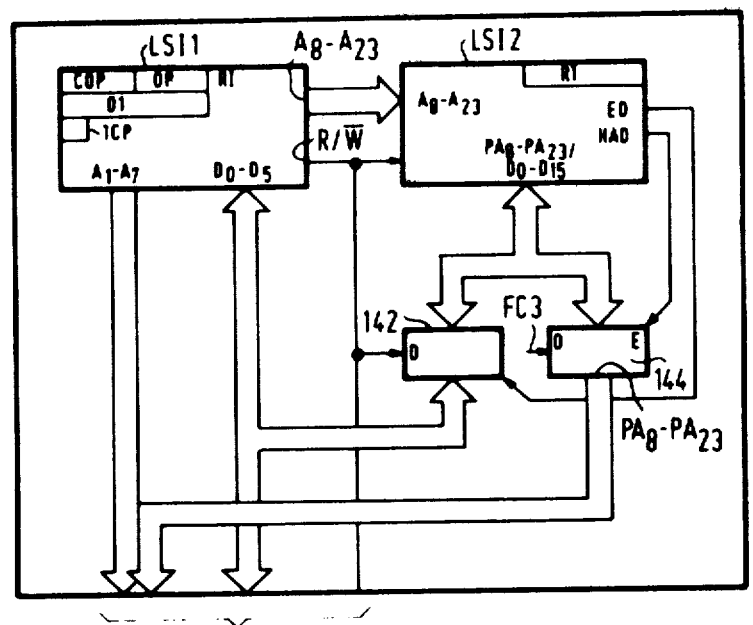
FIG. 2 shows a single processor.

FIG. 2 shows diagrammatically the structure of one of the processors. According to the present state of large scale integration, a processor essientially consists of two interconnected and microprogrammed IC-modules LSI1, LSI2. In this specific situation, two additional, smaller modules 142, 144, were added. In future these four modules will readily be united into a single module. Now module LSI1 comprises especially the hardware for executing the instructions and may be represented by a MC 68000 sixteen bit microprocessor, manufactured by Motorola Corporation, Phoenix, Ariz. It has been divulgated in the MC 68000 users manual, Original issue Sept. 1, 1979 and described in an article by E. Stritter, et al, in Computer, February 1979, p. 43–52. Notable features of this microcomputer are a 16-bit data word, eight 32-bit data registers, seven 32-bit address registers, two 32-bit stack pointers and a 24-bit program counter. It has an instruction length of one to five 16-bit words, of which the first, or operation word, specifies the operation and modes (the further ones specify an immediate operand and address extensions). Furthermore, a sixteen bit status register is provided, containing an eight bit user byte and an eight bit system byte. In addition to address, data and power pins, the package has three processor status pins (FC0, FC1, FC2), three peripheral control pins (E, $\overline{VMA}$, $\overline{VPA}$), three system control pins ($\overline{BERR}$, $\overline{RESET}$, $\overline{HALT}$), five asynchronous bus control pins ($\overline{AS}$, R/$\overline{W}$, $\overline{UDS}$, $\overline{LDS}$, $\overline{DTACK}$), three bus artibtration control pins ($\overline{BR}$, $\overline{BG}$, $\overline{BGACK}$) and three interrupt control pins ($\overline{IPL0}$, $\overline{IPL1}$, $\overline{IPL2}$). As powerful as it is, the MC 68000 microcomputer cannot manage large memory resources by itself. It relies therefore on a second integrated circuit module LSI2 of the type MC 68451 to handle the tasks associated with virtual memory and multitasking support. The unit LSI2 may effect:

address translation from logical to physical memory
separation of user and system resource address space
separation of program and data address spaces
interprocess communication through shared resources
support of both paging and segmentation of memory
provision of multiple memory management units in a system The 64-pin package has a first set of pins associated with the logical address space (address pins A8–A23 and A1–A7, processor status pins, asynchronous bus control pins) a second set of pins associated with the physical address space (bus management pins $\overline{MAS}$, $\overline{WIN}$, $\overline{CS}$, $\overline{IRQ}$, $\overline{IACK}$, data pins PA8–PA23 and further pins $\overline{ED}$, $\overline{HAD}$) and several so-called global connections.

Now, as shown the first seven address bits of LSI1 are directly forwarded to the input/output line 102 as are data bis D0–D15 and a read/write control signal. Address bits A8–A23 are furthermore transported to memory management unit LSI2. The latter has a multiplexed data/address port connected to data transceiver 142, make Texas Instruments, type 74 LS 245 and to address latch 144, make Texas Instruments, type S4 LS 373. Further control is provided by outputs $\overline{ED}$ and $\overline{HAD}$ of element LSI2. In this way the line 104 is provided with a 23 bit address path and a 16 bit data path. A further enlargement of the set-up shown by means of doubling the memory management unit would allow for handling 64 segment descriptors. The inclusion of further control signals to the control part of the standard bus is not further described for brevity. In the following specific reference is made to the instruction register of element LSI1, named R1, and therein the parts COP for storing the operation code, and OP for storing an operand, furthermore to one of the cited registers D1 and a status signalling bit TCP which may be in the status register or in a further one of the cited registers. Furthermore reference is had to register RT of element LSI2 which serves for storing a relevant segment descriptor; these parts form normal elements of the two LSI1, 2 building blocks. For simplicity the storage registers and bits have only been indicated schematically. Consequently, in this set-up the processor, such as P1 in FIG. 1 has only a single data/address part 102. This necessitates a slight modification in FIG. 1 in that line 102 would be connected to block 118 in lieu of line 126. The latter would then be absent. A similar situation would occur in the other data processing devices.

Figure 3:
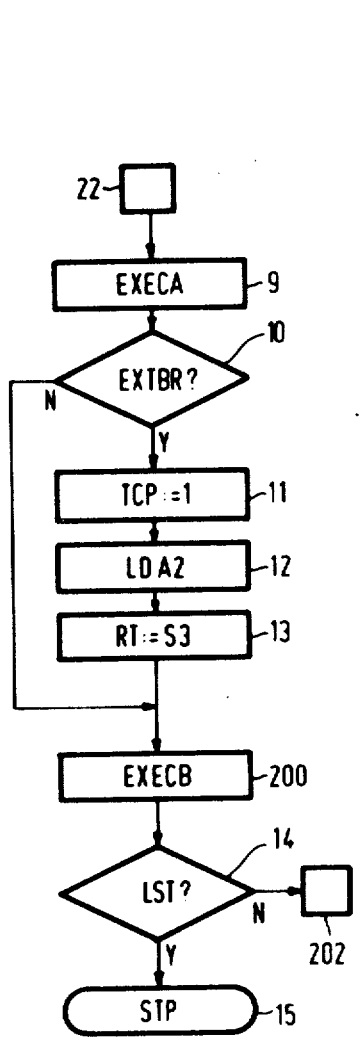
FIG. 3 shows a flow diagram of the realization of a portion change trap—the "execution" part.

FIG. 3 gives a flow diagram of the realization of a portion change trap, the "execution" part thereof; it is understood that the instruction under execution has been fetched already and is present in the instruction register. Block 22 symbolizes the entry to the flow diagram, notably from the flow diagram of FIG. 4. Block 9 of FIG. 3 symbolizes the initial stages of the execution of this instruction. This would in the exemplary situation shown in FIG. 1 be, for example, the instruction that was present in local memory section 144 at address A1. The execution therefore is done in processor P3. At a certain instant during this execution the processor P3 undertakes the detection whether the current instruction is a branch instruction and notably whether this is a so-called "extended branch" instruction; the latter action is symbolized by block 10. The program containing this current instruction was assigned to this specific processor by the assignment algorithm and up to the commencement of the execution thereof placed in the waiting list of processor P3; this could be done by a centralized assignment program. In this example, the program in execution considered consists of three program segments of which segments S1,S2 have been stored in memory section 114 and program segment S3 has been stored in another memory section 112. Now, the two program segments S1, S2 have been placed in program portion "k", for example in that the segment indicator number "k" was inserted into the segment descriptors, either at conception of the program by a programmer, or during loading of the respective segments by a portion number assignment routine. This routine, in a simple form, would assign the same portion number to all program segments of a program provided they were loaded into the same local memory section. It would be allowable that one local memory section contained two groups of program segments associated to two respective programs. Of course, in the latter case each group of program segments has a respective different portion number. Now, in the example shown in FIG. 1, segment S3 is placed in program portion "m", wherein k differs from m. Furthermore, no further program segments, not stored in respective memory sections 114, 112, form part of program portions "k", "m". As stated earlier the grouping of program segments to program portions may be done for operational reasons in that the respective program segments of a single program portion are used coincidingly. Reverting to FIG. 3, the operation code of the current instruction, address A1 is present in register R1 of processor P3 for (further) decoding. The decoding and execution of the instruction is done under microprogram control, but, apart from the steps described, no further explanation is given of the remaining, conventional operation. The detection of the "extended branch" code, to an address outside the current segment, is done in block 10. If this "extended branch" is not present (no branch instruction or a branch within the current segment-branch of the first type) the system goes directly to block 200. If, on the other hand, the current instruction governs a branch of the second type, the processor goes to block 11. In block 11 the signalling bit TCP is set to "1". This "1" signals the out-of-segment branch, and this signalling bit should therefore be at zero at the exit from block 9. This is effected in that either bit TCP is reserved only for this specific signalling. Othersise, this signalling bit may be shared for a further function, but in that case, the further function must ensure that bit TCP is reset to zero before the end of block 9 is reached. In block 12 the logic address A2 of the desired branch is loaded; this address would be the operand of the branch instruction. Furthermore, the number of the destination segment, for example segment S3, is buffered in register RT. In block 200 the remainder (if any) of blocks 9, 200 forms the, possibly conventional, execution of the instruction wherein either one of those blocks 9, 200, may be absent. In block 14 it is detected whether the current instruction was the last one of the program. If so (Y) in block 15 the program is terminated and the waiting list accessed to detect whether a further program is to be executed by the relevant processor (here P3). If not (N) in block 202 the execution of the current instruction has thus been completed, and the system goes to FIG. 4.

Figure 4:
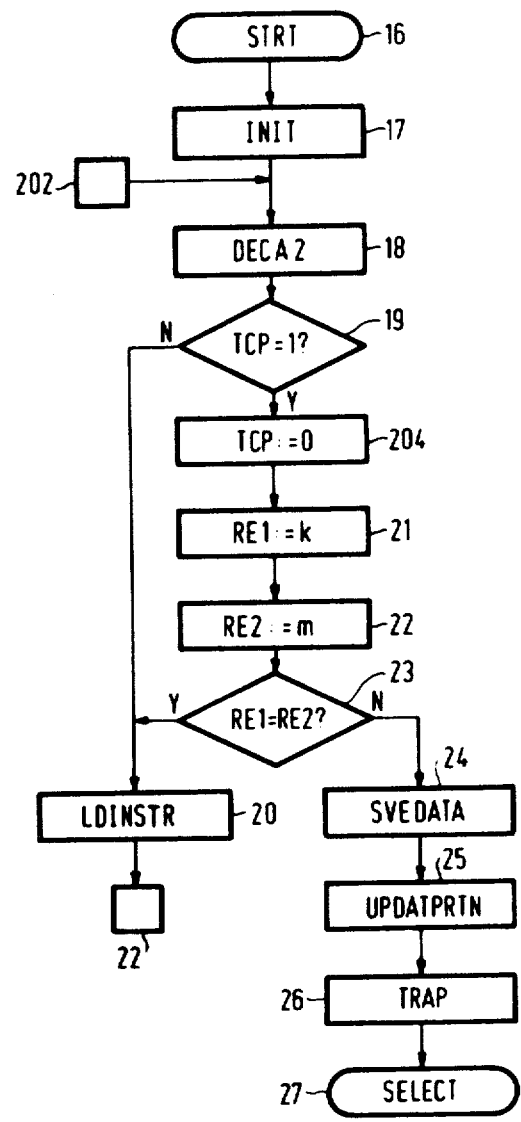
FIG. 4 shows a flow diagram of the realization of a portion change trap—the "fetch" part.

FIG. 4 shows a flow diagram of a second part of a realization of the portion change trap, the "fetch" part. In addition thereto the initializing steps of the program are shown. Block 16 symbolizes the start of the program when it is taken from the waiting list of the relevant data processing device. Block 17 symbolizes the normal initializing steps before the program is started; among other things, it would be required that at the end thereof signalling bit TCP were zero, and the address of the initial instruction (here considered as the "next" address, A2) loaded. The functions in blocks 14, 15, 16, 17 are given by way of example.

Block 202 symbolizes the entry from the flow diagram of FIG. 3. In block 18 the logical address of the next instruction A2 is translated into a physical address. As is well known, a logical memory address as a kind of number: the address parts (bits or bit groups) need to bear no relationship to the physical partitioning of the memory, such as in this case to the respective memory sections. On the other hand, a physical address may contain several parts, each part thereof addressing a specific memory device or sub-device. Consequently, this translation would produce the portion number, which in case of address A2 would be "m". Next, the processor, in block 19, tests the state of signalling bit TCP, which, in case of a negative response (N) controls a transition to block 20, which will be considered hereinafter. If, however signalling bit TCP is in the "1" state, the system goes to block 204. In block 204 signalling bit TCP is reset to zero and is no further used until a possible next entrance in FIG. 3, block 11, or, as explained before, possibly for executing a different routine which would eventually leave this bit position at zero at the latest when leaving block 9 in FIG. 3. Reverting to FIG. 4, in block 21 the number of the current program portion (in case of current address A1 this would be "k") is buffered in the input register RE1 of the arithmatic and logic unit (ALU) of the part LSI1 of processor P3. In block 22 the portion number of the destination address (in case of destination address A2 in program segment S3 this would be "m") is buffered in a further input register RE2 of the arithmetic and logic unit of the part LSI1 of processor P3. The destination address contains in this example the instruction code $COP_{c+1}$ of the instruction required next. Alternatively, such destination address could contain any other program element required next. In block 23 the unit LSI1 tests whether the contents of the two registers RE1 and RE2 are identical. If they are identical (Y) no portion changing is required and the system goes to block 20. This could, even in case of an extended branch instruction, occur during a transition from program segment S1 to program segment S2, both of which are in program portion "k". If the two numbers are not equal (N) in block 24 the status of the current program is saved: depending on the state of the program the contents of the program counter, of crucial parameters and register contents are saved in buffer storage proper to the current program. Saving measures are well-known, and for brevity no further explanation is given. Next, in block 25 the current portion number is updated from "k" to "m". Alternatively, the updating could be executed in block 17, while block 25 were suppressed. In the next block, block 26 a portion changing interrupt signal is generated for the waiting list program. This portion changing interrupt signal contains the program portion number "m" (destination) and possibly, one or more data that are to be used instanteously when entering program portion "m". The portion changing interrupt signal furthermore implies the instruction fetch of the first instruction of the trap routine by processor P3. This routine is present in a program segment stored in the local memory section of processor P3, it has not been shown in the Figure. Finally, in block 27, processor P3 abandons the current program and selects the next program present in its own waiting list. The start of the execution thereof would imply going to block 16 in FIG. 4 again. The same occurs when the "stop" block 15 in FIG. 3 is reached.

On the other hand, the assignment program must place the portion changing interrupt request in the waiting list for the intended processor, in this case, processor P2. If the assignment program is to be executed by a specific one of the processors the associated task may have preference over any task presently being executed in this specific processor. In certain cases, the user may have specified that a different processor would be better suited to execute program segment S3; then the assignment program would process the request correspondingly. It is to be noted that also the generation of a waiting list for any processor may be done according to one of several principles. Examples are "first come-first served", and an algorithm wherein each program has a fixed priority level among the programs. If, however, in the foregoing block 20 is reached, therein the destination instruction is loaded from the local memory section into the instruction register of the local processor. In this case no portion change would be effected. Thereafter, via block 22 the execution cycle in FIG. 3 is reached again.

In certain cases the program could contain further program segments, such as segment S4, also present in local memory section 112. A first approach would be to give program segments S3 and S4 the same program portion number. Branching from program segment S3 to program segment S4 (for example to destination address A3) would produce no portion change. In other cases it could be advantageous or even necessary to assign different program portion numbers "m" and "n" as shown. Examples could be that program segment S4 is shared by several programs or that the occurrence of a branch between segments S3 and S4 would be an exceptional case. It should be remembered that all program segments of the same program portion should be stored at a single local memory section and the ensuing storage requirement for one local memory section could endanger the flexibility of memory management. However, if program segments S3, S4 have different portion numbers a branch between them would trigger a portion change and this would cause a decrease of processing efficiency. Obviously, the adverse effects of both choices may vary from case to case.

In certain situations it is advantageous to nullify a "portion changing trap" signal in case it would refer to a specific or privileged portion number. Although several such privileged portion numbers could exist in any single system, in the following only a single one is considered; portion number "zero". This program portion could contain one or more program segments, such as segment S0. Such segment could contain a service routine, such as a conversion or encryption routine. This service routine would repeatedly be addressed from various other segments S1, S2, S3, S4 of the program being executed or even from various different programs. As shown in FIG. 1, segment S0, portion "zero", has been loaded in memory section 110. Especially if the execution of the service routine requires only limited data/address transfer over the common standard bus and local bus 134 the delay by such transfer (and the required contention for the shared bus facilities) would only produce a limited slow-down in the processing. This slow-down should balance the delay incurred by the double portion change during the calling to and the return from the service routine, the updating of the waiting lists, and so on.

Figure 5:
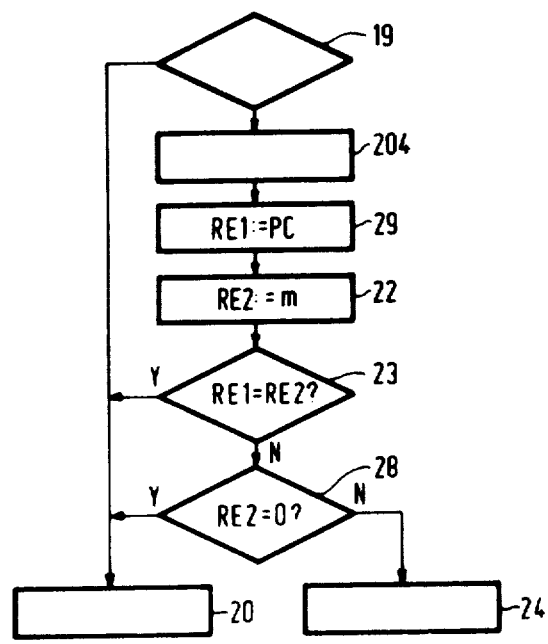
FIG. 5 gives a variation to FIG. 4.

In consequence, FIG. 5 gives a variation to FIG. 4, while only a part of the earlier flow diagram has been repeated. Blocks 19, 20, 22, 23, 24 are identical to the corresponding blocks in FIG. 4. Two notable differences are present with respect to FIG. 4. In the first place a storage address PC has been used in the machine for storing the program portion number of the portion currently being executed. This would be the storage address that is updated in block 25 of FIG. 4. Now, in block 29, the number of the current program portion is fetched from address position PC and buffered in the input register RE1 of the arithmetic and logic unit of the part LSI1 of the originating processor. Furthermore, in block 28 it is tested whether the portion number of the destination portion is equal to zero. If it is, the trap is not effected as the system goes to block 20: this means that the contents of address position PC are not updated either. Now, when the privileged program portion is called, the test in block 28 has a positive outcome. Alternatively, upon return from the privileged program portion the test in block 23 has a positive outcome because PC still contains the first portion number. On the other hand when a non-privileged program portion is called, the tests in blocks 23, 28 give negative outcomes, both at the calling to the latter program portion and at the return therefrom. It should be noted that a call from the privileged program portion to another portion than the originating portion does not imply a return. Consequently, both tests in blocks 23, 28 would give a negative outcome and in consequence, block 24 is reached. A similar situation would arise when there were two (or more) privileged program portions. The test in block 28 would then be for equality to either of the privileged program portion numbers.

What is claimed is:

1. A multiprogramming data processing system comprising a plurality of data processing devices interconnected by a common standard bus (100) for transporting address signals and data signals, wherein each data processing device comprises:
    a. a local data processor P1-P4 having a first data port connected to the standard bus;
    b. a local memory section (110-116) having a second data port connected to the standard bus;
    c. a local bus (126-132) interconnecting the local data processor to the local memory section;
    d. priority means (118-124) for providing a local data processor with a privileged access to the associated local memory in preference over a memory access arriving over the standard bus;

the data processing system furthermore having:
    A. an overall memory encompassing the aggregating local memories for storing respective program segments for any program to be executed;
    B. waiting list means for receiving and storing a succession of program execution request signals arriving by way of the standard bus and for each such request signal generating a waiting list item for an associated data processing device; wherein each data processing device furthermore comprises:
    e. first detector means (10) for selectively detecting during execution of a program segment therein a non-branch instruction, a first type branch instruction governing a branch within the current program segment, and a second type branch instruction governing a branch outside the current segment;
    f. second detector means (23) for upon detection of a second type branch instruction selectively detecting a branch within the current program portion containing the program segment being executed and a portion changing branch to a second program portion differing from the current program portion and thereupon generating a portion changing interrupt signal (26) while terminating the execution of the current program portion;
    g. execution request signalling means (27) for upon generation of a portion changing interrupt signal accessing said waiting list means with a program execution request signal for the program containing the program portion thus terminated and a waiting list accessing signal for interrogating a waiting list item from its own waiting list.

2. A system as claimed in claim 1 wherein each data processing device furthermore comprises third detector means (28) for detecting in a second type branch instruction a predetermined program portion number and thereupon nullifying the associated portion changing interrupt signal both at entering and at returning from said predetermined program portion.

3. A data processing device for use in a data processing system as claimed in claims 1 or 2, wherein said second detector means comprise comparing means for upon decoding of a second type branch instruction comparing the portion numbers of the current program portion and the program portion containing the destination address of the second type branch.

4. A data processing device for use in a data processing system as claimed in claim 1 or 2, wherein said second detector means comprise address translator means (18) for upon reception of a second type branch instruction translating a logical address into a physical address comprising a device number, and comparing means for comparing the latter device number to its own device number.

* * * * *